(12) United States Patent
Kawabata et al.

(10) Patent No.: US 11,215,220 B2
(45) Date of Patent: Jan. 4, 2022

(54) HINGE DEVICE AND IMAGE FORMING APPARATUS

(71) Applicant: SHARP KABUSHIKI KAISHA, Sakai (JP)

(72) Inventors: Katsuki Kawabata, Sakai (JP); Masaya Kawatsuri, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 258 days.

(21) Appl. No.: 16/548,087

(22) Filed: Aug. 22, 2019

(65) Prior Publication Data

US 2020/0063790 A1 Feb. 27, 2020

(30) Foreign Application Priority Data

Aug. 27, 2018 (JP) .............................. JP2018-158173

(51) Int. Cl.
*F16C 11/10* (2006.01)
*F16C 11/04* (2006.01)

(52) U.S. Cl.
CPC ............ *F16C 11/04* (2013.01); *F16C 11/103* (2013.01); *Y10T 403/32581* (2015.01)

(58) Field of Classification Search
CPC . E05Y 2900/606; E05D 11/06; E05D 11/087; F16C 11/10; F16C 11/103; Y10T 403/32557; Y10T 403/32581; Y10T 403/32861
See application file for complete search history.

(56) References Cited

U.S. PATENT DOCUMENTS

| | | | | |
|---|---|---|---|---|
| 6,666,422 B1* | 12/2003 | Lu | ......................... | G06F 1/1616 16/340 |
| 6,671,928 B2* | 1/2004 | Huang | .................... | F16M 11/10 16/337 |
| 7,644,473 B2* | 1/2010 | Chen | ...................... | G06F 1/1601 16/340 |
| 8,046,875 B2* | 11/2011 | Wang | ...................... | F16M 11/10 16/338 |
| 2003/0097732 A1* | 5/2003 | Kim | ....................... | G06F 1/1656 16/337 |
| 2007/0174997 A1* | 8/2007 | Lu | ....................... | B60R 11/0235 16/367 |

(Continued)

FOREIGN PATENT DOCUMENTS

CN 101839277 A 9/2010
CN 207177557 U 4/2018
(Continued)

*Primary Examiner* — Michael P Ferguson
(74) *Attorney, Agent, or Firm* — ScienBiziP, P.C.

(57) ABSTRACT

A hinge device according to the present invention includes a pivotable member pivotable relative to a fixed member around a first screw member or a second screw member serving as a pivot shaft. A rotation restricting washer is disposed between a movable plate portion of the pivotable member and a bearing face of the second screw member. The rotation restricting washer is disposed non-turnably relative to a support plate portion of the fixed member by fitting a restricting piece disposed on one of the support plate portion and the rotation restricting washer into a receiving portion disposed on the other one of the support plate portion and the rotation restricting washer.

6 Claims, 12 Drawing Sheets

(56) References Cited

U.S. PATENT DOCUMENTS

| | | | | |
|---|---|---|---|---|
| 2008/0172835 A1* | 7/2008 | Hsu | ............... | E05D 11/087 |
| | | | | 16/305 |
| 2010/0236023 A1 | 9/2010 | Wang et al. | | |
| 2011/0061197 A1* | 3/2011 | Shimomura | ........ | H04M 1/0216 |
| | | | | 16/303 |
| 2011/0265287 A1* | 11/2011 | Li | ................ | G06F 1/1681 |
| | | | | 16/297 |

FOREIGN PATENT DOCUMENTS

| | | |
|---|---|---|
| JP | 2016-114749 A | 6/2016 |
| WO | 2016/098749 A1 | 6/2016 |

\* cited by examiner

HINGE DEVICE AND IMAGE FORMING APPARATUS

BACKGROUND OF THE INVENTION

Field of the Invention

The present invention relates to a hinge device and an image forming apparatus, and more specifically to, for example, a hinge device pivotally connecting an operation panel to the body of an image forming apparatus, and an image forming apparatus including the hinge device.

Description of the Background Art

Japanese Unexamined Patent Publication No. 2016-114749 discloses an example of a typical hinge device or hinge structure. The hinge structure of Japanese Unexamined Patent Publication No. 2016-114749 is used in eyeglass frames, and includes a first bracket and a second bracket turnable relative to each other around a screw fastening body or screw member serving as a rotary shaft. The first bracket has a groove shape or U-shape, and includes first and second sleeves disposed a predetermined distance apart from each other along the axial direction, and a first arm disposed continuous with the first and second sleeves. A sleeve of the second bracket is disposed between the first and second sleeves. The hinge structure according to Japanese Unexamined Patent Publication No. 2016-114749 further includes a rotation stopper disposed between the first bracket and the head of the screw fastening body. A first engagement mechanism is disposed between the head of the screw fastening body and the rotation stopper, the first engagement mechanism retaining an engagement state even when a rotational force is applied in a specific direction. A second engagement mechanism is disposed between the rotation stopper and an engagement portion of the first bracket, the second engagement mechanism retaining an engagement state even when a rotational force is applied in a specific direction.

In the technique according to Japanese Unexamined Patent Publication No. 2016-114749, the sleeve of the second bracket is held in the groove in the first bracket. Thus, when the screw fastening body is tightened, the sliding faces are likely to come into contact with each other in an oblique state, making it difficult to appropriately bring the entire areas of the sliding faces into contact. That is, the surface contact state of the sliding surfaces is likely to vary, and it becomes difficult to appropriately set the rotational torque between the first bracket and the second bracket.

On the other hand, the hinge device is also used to turnably connect the operation panel to the body of the image forming apparatus. In such a case, the rotational torque is appropriately set by adopting a structure in which the fixed member and the pivotable member of the hinge device are disposed such that two plate-like portions are aligned in the axial direction without adopting a structure in which one of the fixed member and the pivotable member holds the other one. Also, in such a case, loosening due to co-rotation of the screw member should be prevented. However, the basic structure of the hinge device differs from that of Japanese Unexamined Patent Publication No. 2016-114749 as described above, the technique of Japanese Unexamined Patent Publication No. 2016-114749 cannot be used without modification.

Thus, an object of the present invention is to provide a novel hinge device and a novel image forming apparatus.

Another object of the present invention is to provide a hinge device and an image forming apparatus capable of appropriately preventing loosening of a screw member due to a pivoting operation of an operation panel.

SUMMARY OF THE INVENTION

A first aspect of the present invention provides a hinge device pivotably connecting an operation panel to a body of an image forming apparatus, the hinge device including a fixed member having a support plate portion and fixed to the body; a first screw member disposed non-turnably on the support plate portion; a second screw member fastened to the first screw member; a pivotable member including a panel support portion supporting the operation panel; and a movable plate portion held between the support plate portion and a bearing face of the second screw member, the pivotable member being pivotable relative to the fixed member around the first screw member or the second screw member serving as a pivot shaft; and a rotation restricting washer disposed between the movable plate portion and the bearing face of the second screw member, one of the support plate portion and the rotation restricting washer having a restricting piece extending in an axial direction of the pivot shaft, the other one of the support plate portion and the rotation restricting washer having a receiving portion that is fitted over the restricting piece to restrict turning of the rotation restricting washer relative to the support plate portion.

According to the first aspect of the present invention, a rotation restricting washer is disposed between the movable plate portion and the bearing face of the second screw member. The turning of the rotation restricting washer relative to the support plate portion is restricted by fitting the receiving portion over the restricting piece. In this way, by disposing the rotation restricting washer that is non-turnable relative to the support plate portion, only the components disposed between the support plate portion and the rotation restricting washer turn when the operation panel or pivotable member pivots, thereby preventing the second screw member from rotating together with the operation panel. Thus, loosening of the second screw member relative to the first screw member can be prevented.

According to the first aspect of the invention, the rotation restricting washer is disposed to appropriately prevent loosening of the screw member due to a rotational operation of the operation panel.

According to a second aspect dependent on the first aspect of the present invention, the rotation restricting washer has an extension projecting radially outward, and the restricting piece or the receiving portion is disposed on the extension.

According to a third aspect dependent on the first or second aspect of the present invention, the movable plate portion has a cutout through which the restricting piece passes to restrict a pivoting angle of the pivotable member relative to the support plate portion. In specific, in cooperation with the cutout, the restricting piece serves also as an angle restrictor that restricts the pivot angle of the pivotable member relative to the support plate portion.

According to a fourth aspect dependent on one of the first to third aspects of the present invention, the hinge device further includes a friction washer disposed between the support plate portion and the movable plate portion. The friction washer is a flat washer that determines the friction coefficient of the sliding faces between the support plate portion and the movable plate portion.

According to a fifth aspect dependent on one of the first to fourth aspects of the present invention, the hinge device further includes at least one spring washer disposed between the movable plate portion and the bearing face of the second screw member.

According to a sixth aspect dependent on the fifth aspect of the present invention, the spring washer includes a disc spring, and the disc spring in contact with the rotation restricting washer is disposed such that a protruding face of the disc spring is in contact with the rotation restricting washer.

A seventh aspect of the present invention provides an image forming apparatus including an operation panel pivotable relative to a body of the apparatus, the body and the operation panel being connected using the hinge device according to any one of the first to sixth aspects of the present invention.

According to the aspects of the invention, loosening of the screw member due to the rotational operation of the operation panel can be appropriately prevented.

The above-described objects, other objects, features and advantages of the present invention will become more apparent from the detailed descriptions of the following embodiments given with reference to the drawings.

DESCRIPTION OF THE PREFERRED EMBODIMENTS

First Embodiment

Figure 1:
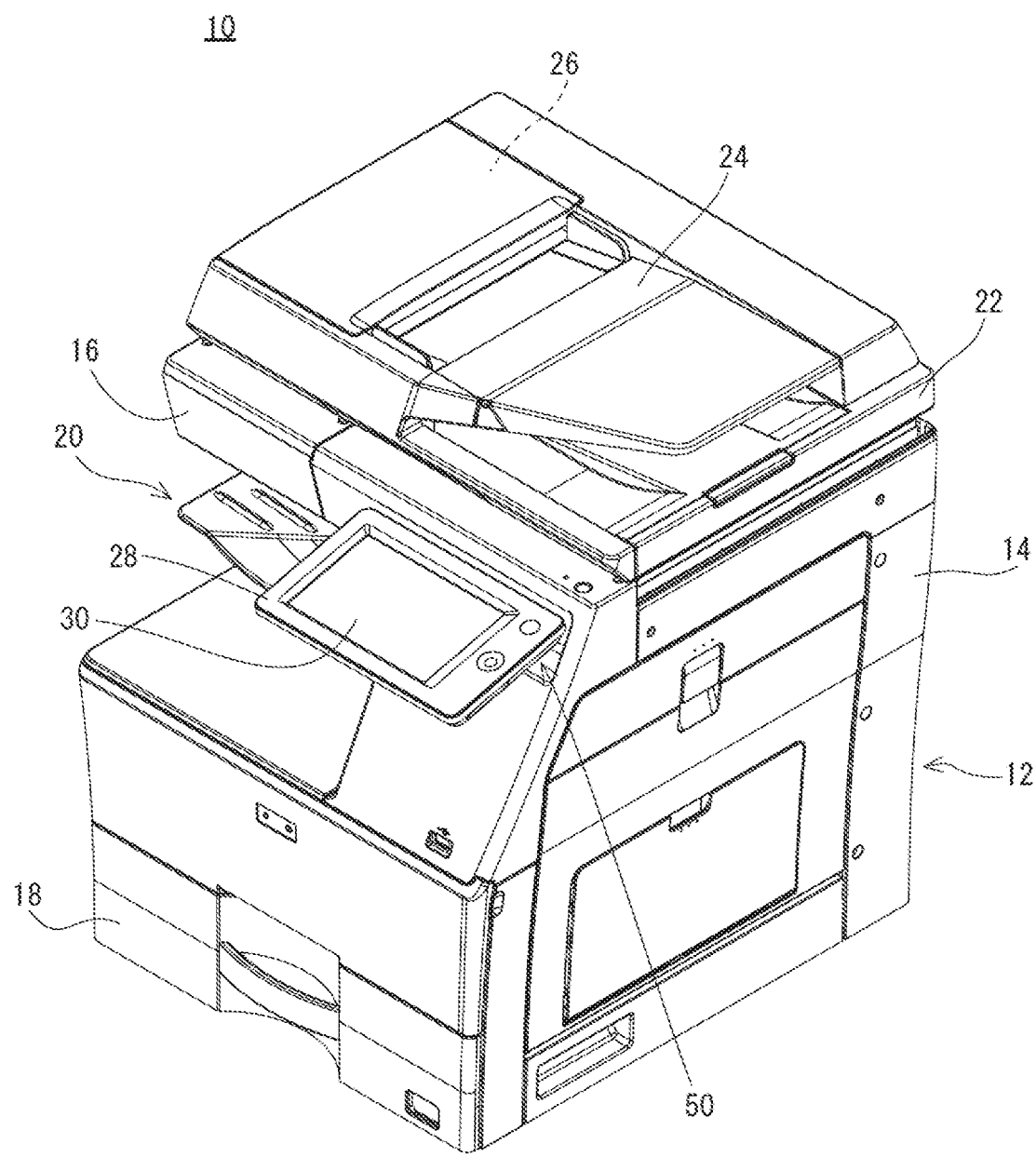
FIG. 1 is a perspective view illustrating an example of an image forming apparatus including a hinge device according to a first embodiment of the present invention.

With reference to FIG. 1, a hinge device 50 according to an embodiment of the present invention is disposed on an image forming apparatus 10 for forming multi-color or single-color images on predetermined sheets or recording media. As described in detail below, the hinge device 50 includes a tilt hinge pivotably connecting an operation panel 28 with a body 12 of the image forming apparatus 10, and supports the operation panel 28 pivotably in the vertical direction about a horizontal axis.

The basic configuration of the image forming apparatus 10 will now be briefly described. Note that, in this embodiment, the front-back direction or depth direction of the image forming apparatus 10 and its components is defined by determining, as a forward face or front face, a surface facing a user, that is, the surface on which the operation panel 28 is provided; and the left-right direction or transverse direction of the image forming apparatus 10 and its components is defined on the basis of the point of view of the user.

Figure 2:
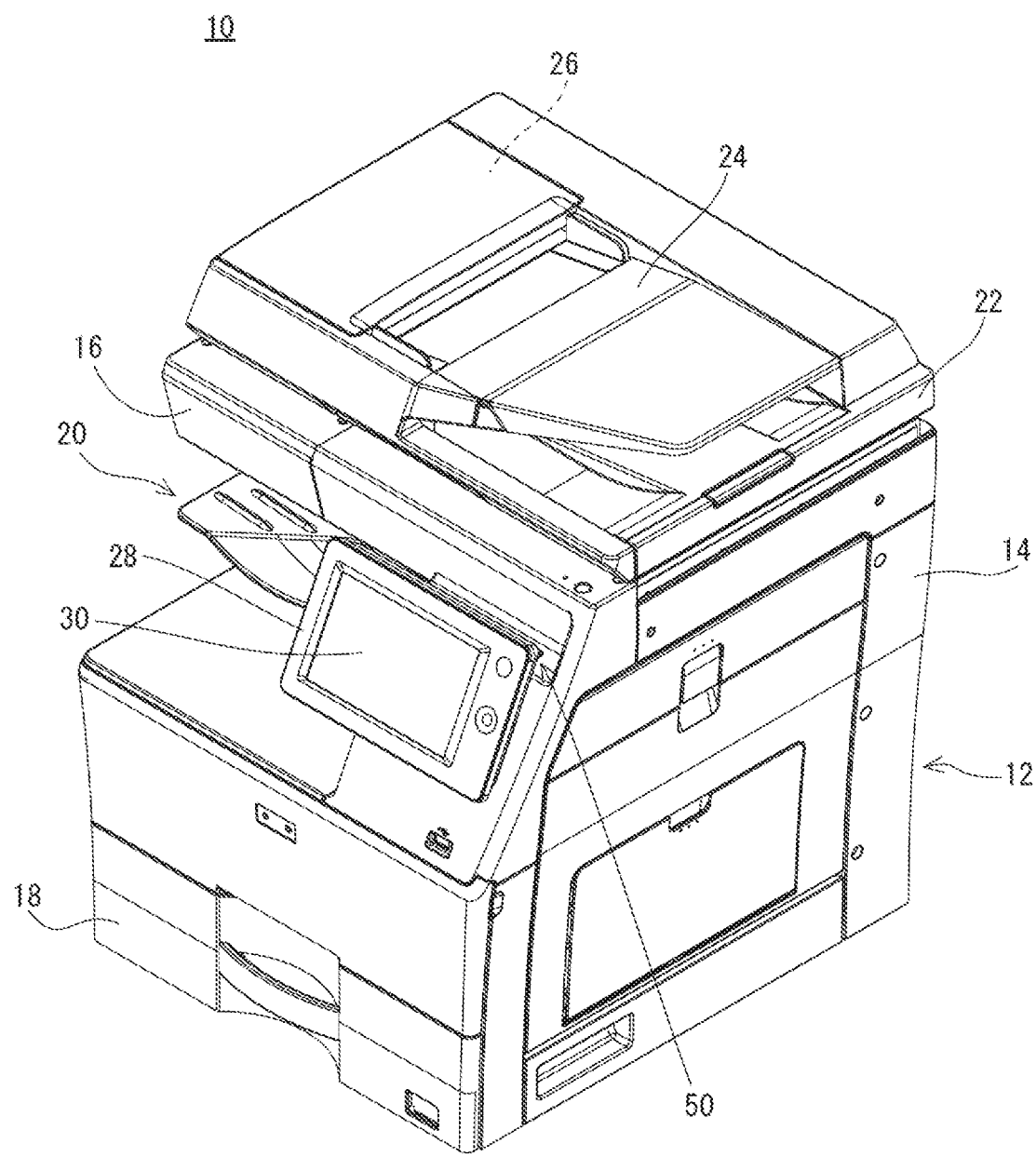
FIG. 2 is a perspective view illustrating an operation panel of the image forming apparatus in FIG. 1 in a forward tilted state.

As shown in FIGS. 1 and 2, the image forming apparatus 10 according to the first embodiment is a multifunction peripheral (MFP) having functions such as a printer function, a facsimile function, a copier function, and a scanner function. The image forming apparatus 10 includes the body 12 including an image former 14, an image reader 16, and the like.

The image former 14 includes an exposure unit, a developing unit, a photosensitive drum, a charger, an intermediate transfer belt, a transfer roller, a fixing unit, and the like. The image former 14 forms, using an electrophotographic method, images on sheets transported from a sheet feeding cassette 18 disposed below the image former 14 by a sheet feeding mechanism.

In specific, in the image former 14, the charger, the exposure unit, etc., form an electrostatic latent image corresponding to image data on the photosensitive drum, and the developing unit develops the electrostatic latent image on the photosensitive drum with toner. The toner image on the photosensitive drum is transferred to a sheet by the intermediate transfer belt, the transfer roller, etc. The toner image transferred to the sheet is then thermally fixed by the fixing unit. Subsequently, the sheet on which the image has been formed is ejected to an in-body sheet receiving tray 20. Note that the image data for forming an image on a sheet is image data read by the image reader 16, image data sent from an external device, or any other image data.

The image reader 16 includes a housing. A document placing table formed of a transparent material is disposed on the top face of the housing. The housing accommodates a light source, multiple mirrors, an imaging lens, a line sensor, and the like. The image reader 16 exposes the sheet face with light from the light source, and guides the light reflected from the sheet face to an imaging lens via the mirrors. The imaging lens then forms an image of the reflected light on a light receiving element of the line sensor. The line sensor detects the luminance and the chromaticity of the image of the reflected light formed on the light receiving element, thereby generating image data based on the image on the sheet face. The line sensor may be a charge coupled device (CCD), a contact image sensor (CIS), or the like.

A document holding cover 22 is attached to the upper face of the housing of the image reader 16 so as to be freely opened and closed, via the hinge device or the like disposed on the back side of the housing. The document holding cover 22 includes an automatic document feeder (ADF) 26 for automatically feeding the sheets placed on a document tray 24 one sheet at a time to the image reading position of the image reader 16.

The operation panel 28 is disposed on the front side of the body 12. The operation panel 28 is also referred to as an "operating device" or an "operating unit." The operation panel 28 has a shape of a horizontally long rectangular plate.

A touch panel display 30 and various hardware keys (operation buttons) are disposed on the top face of the operation panel 28. In this embodiment, the touch panel display 30 includes a touch panel disposed on a display. Alternatively, the touch panel display 30 may be an integrated unit of a touch panel and a display. The display is a general-purpose display, such as a liquid crystal display (LCD) or an electroluminescent (EL) display. The touch panel is a general-purpose touch panel of an electrostatic capacitive type, a resistive film type, an electromagnetic induction type, an infrared type, or any other type.

The operation panel 28 having such a configuration is connected with the body 12 using the hinge device 50 such that the upper face of the operation panel 28 or the touch panel display 30 is pivotable between a normal state and a forward tilt state. The upper face faces substantially upward in the normal state, as illustrated in FIG. 1, and substantially forward in the forward tilt state, as illustrated in FIG. 2.

Figure 3:
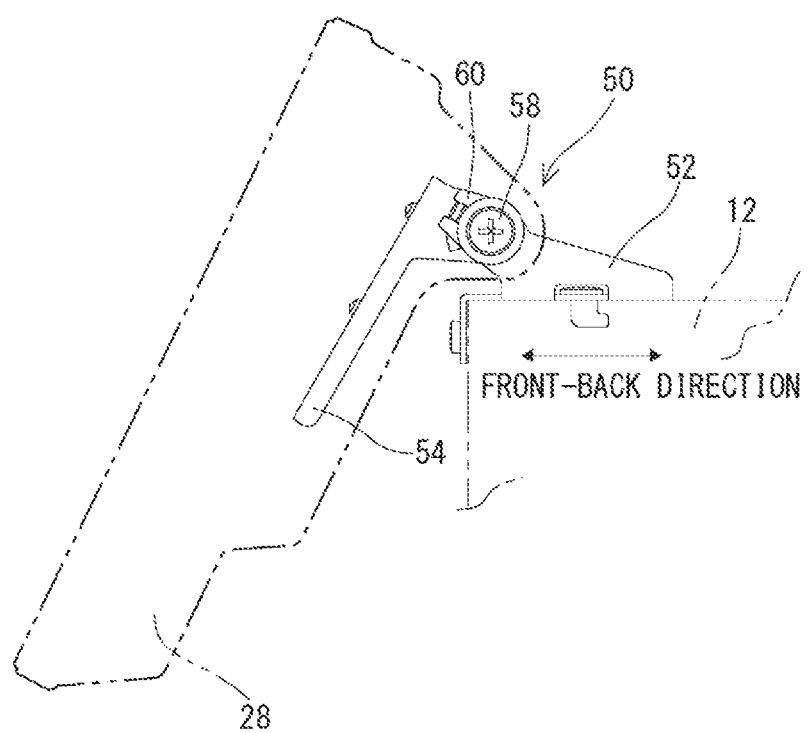
FIG. 3 is a side view of a hinge device according to the first embodiment of the present invention.

The configuration of the hinge device 50 will now be described in detail with reference to FIGS. 3 to 11. As illustrated in FIG. 3, the hinge device 50 is disposed on the back side of the operation panel 28 and pivotably supports the operation panel 28. In this embodiment, two hinge devices 50 are disposed on both ends of the operation panel 28 in the left-right direction, i.e., the operation panel 28 is supported at left and right positions with the two hinge devices 50. The number, position, etc. of the hinge device 50 may be appropriately modified according to the dimensions, etc., of the operation panel 28.

As illustrated in FIG. 3 to 6, the hinge device 50 includes a fixed member 52 and a pivotable member 54. The fixed member 52 is fixed to the body 12 of the image forming apparatus 10. The pivotable member 54 is connected with the fixed member 52 such that the pivotable member 54 is pivotable around a screw member or fastening member 56 or 58 serving as a pivot shaft, and supports the operation panel 28. In other words, the pivotable member 54 pivotable relative to the fixed member 52 enables the operation panel 28 to pivot relative to the body 12. The hinge device 50 further includes a rotation restricting washer 60, a friction washer 62, spring washers 64, and the like.

With reference to FIGS. 3 to 6 and FIG. 7, the fixed member 52 is formed by bending a metal plate, and has a fixed plate portion 66 and a support plate portion 68. The fixed plate portion 66 is fixed to the body 12, and has a flat rectangular shape extending in the front-back direction. The fixed plate portion 66 has holes for passing fixtures, such as screws, a catch engaged with the body 12, and other appropriate structures.

The support plate portion 68 supports the first screw member 56, and vertically erects from one side of the fixed plate portion 66. The support plate portion 68 has a substantially oval mounting hole 70 to which the first screw member 56 is attached. The support plate portion 68 has a flat rectangular restricting piece 72 extending in the axial direction of the first screw member 56 or the rotary shaft.

With reference to FIGS. 3 to 6 and FIG. 8, the pivotable member 54 is formed by bending a metal plate, and includes a panel support portion 74 and a movable plate portion 76. The panel support portion 74 supports the operation panel 28 and has a flat rectangular shape. The panel support portion 74 has holes for passing fixtures, such as screws, and other appropriate structures.

The movable plate portion 76 extends from one side of the panel support portion 74 in a direction orthogonal to the extending direction of the panel support portion 74. The movable plate portion 76 has a circular insertion hole 78 through which a shaft 82 of the first screw member 56 passes. The movable plate portion 74 is slidably held between the support plate portion 68 and a bearing face 94 of the second screw member 58. The proximal region of the movable plate portion 76 has a cutout 80 that is a through hole arcuately extending along the insertion hole 78. As described below, in cooperation with the restricting piece 72 of the fixed member 52, the cutout 80 functions as an angle restrictor that restricts the pivot angle of the pivotable member 54 relative to the support plate portion 68.

With reference to FIGS. 3 to 6 and FIG. 9, the first screw member 56 is an internal thread member including a cylindrical shaft 82 having threads on its inner circumferential face, and a discoid flange 84. The proximal end of the shaft 82 has a substantially oval fitting portion 86 that is fitted into the mounting hole 70 of the support plate portion 68. The first screw member 56 having such a configuration is non-turnably attached to the support plate portion 68 by fitting the fitting portion 86 into the mounting hole 70 of the support plate portion 68. In this embodiment, the shaft 82 protruding rightward from the support plate portion 68 is used as a pivot shaft for pivotably supporting the pivotable member 54.

With reference to FIGS. 3 to 6 and FIG. 10, the second screw member 58 is an external thread member fastened to the first screw member 56, and has a cylindrical shaft 88 having threads on its outer peripheral face, and a head 90 disposed at one end of the shaft 88. In this embodiment, a washer 92 is preliminarily attached to the shaft 88 of the second screw member 58. One face of the washer 92 serves as the bearing face 94 of the second screw member 58.

With reference to FIG. 3 to FIG. 6 and FIG. 11, the rotation restricting washer 60 has a flat annular body 100 having a circular insertion hole 100*a* for passing the shaft 82 of the first screw member 56. The rotation restricting washer 60 is disposed between the movable plate portion 76 and the bearing face 94 of the second screw member 58. The rotation restricting washer 60 has an extension 102 protruding radially outward from the body 100. The extension 102 has a recessed receiving portion 104 that is fitted over the restricting piece 72 of the fixed member 52. As described below, in cooperation with the restricting piece 72, the receiving portion 104 functions as a rotation restrictor that restricts the turning of the rotation restricting washer 60 relative to the support plate portion 68 and that also prevents co-rotation of the second screw member 58.

Figure 4:
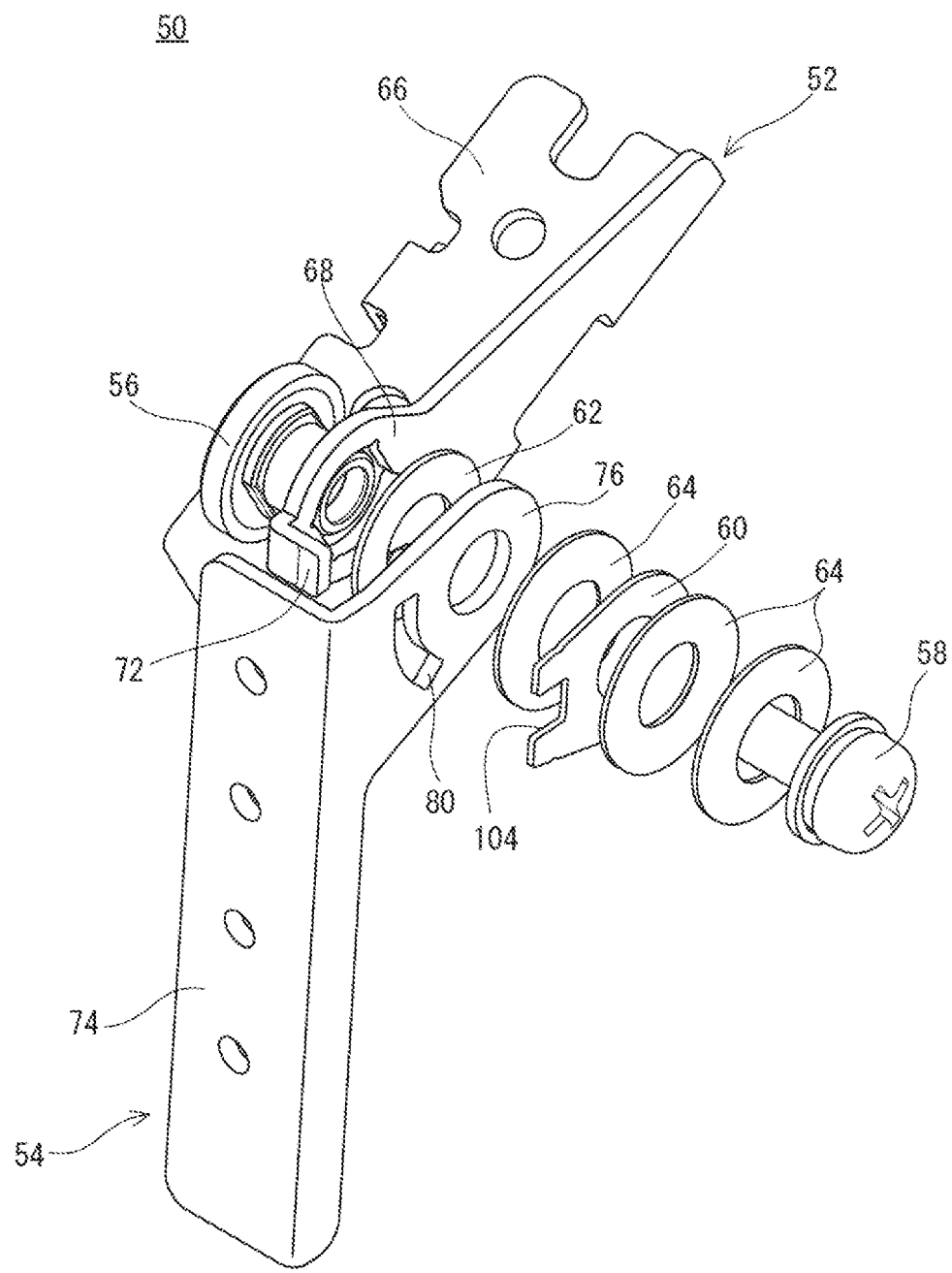
FIG. 4 is an exploded perspective view of the hinge device in FIG. 3.
Figure 5:
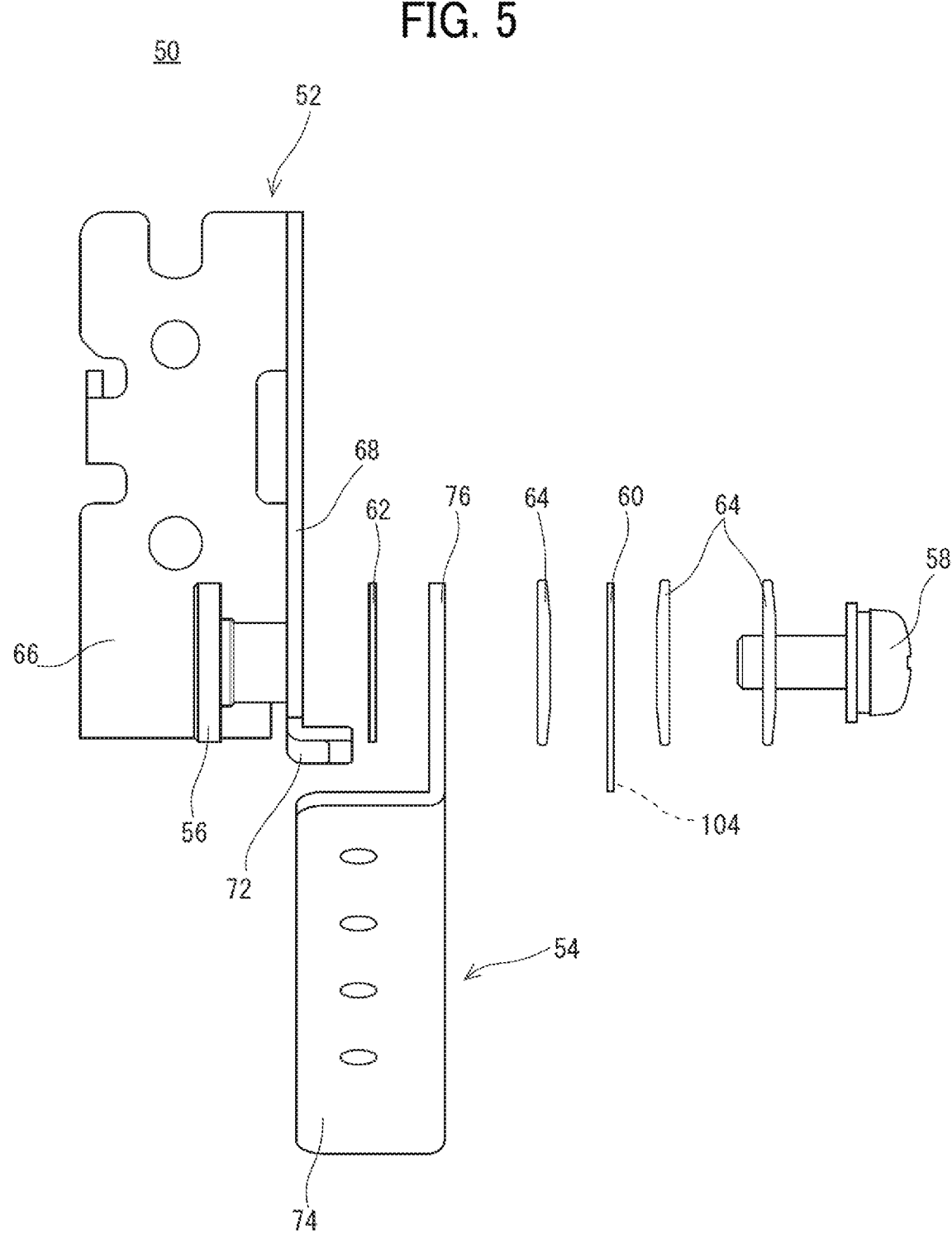
FIG. 5 is an exploded plan view of the hinge device in FIG. 3.
Figure 6:
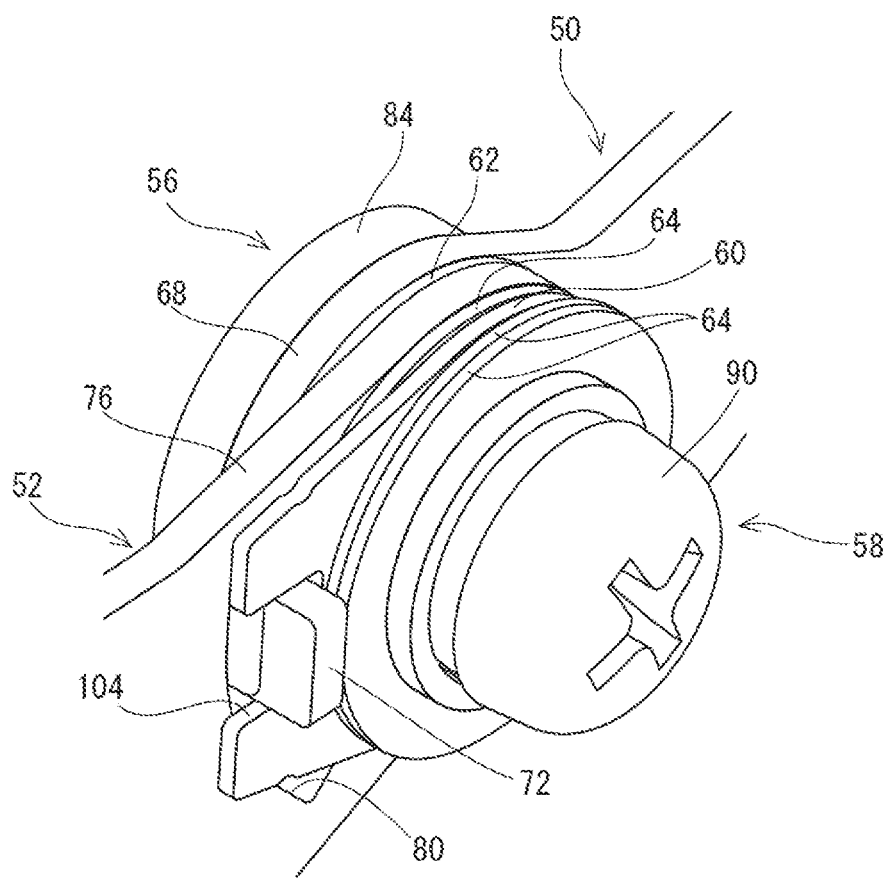
FIG. 6 is an enlarged view of a fastened region of the hinge device in FIG. 3.
Figure 7:
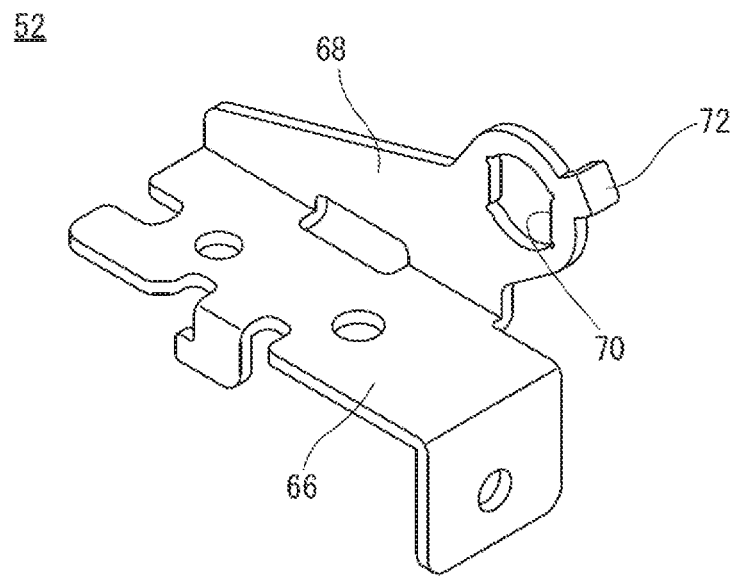
FIG. 7 illustrates a fixed member of the hinge device in FIG. 3.
Figure 8:
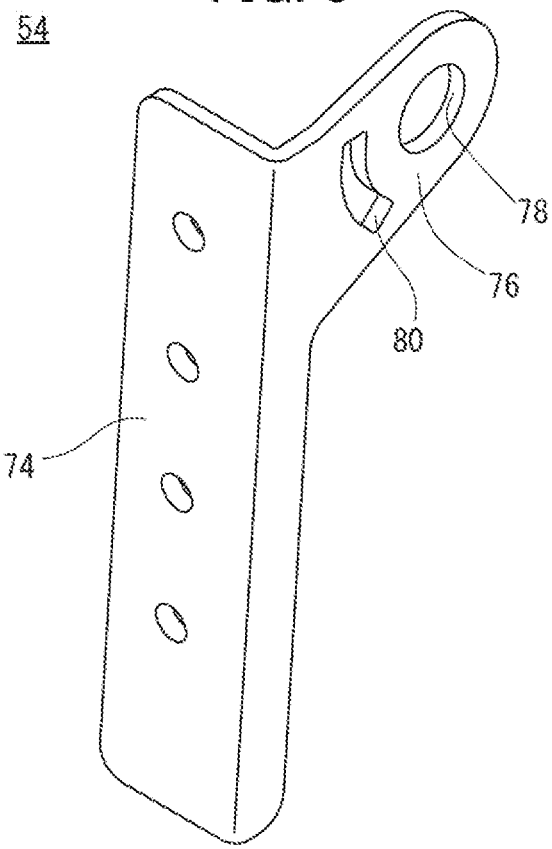
FIG. 8 illustrates a pivotable member of the hinge device in FIG. 3.
Figure 9:
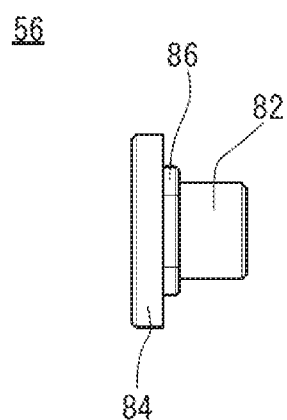
FIG. 9 illustrates a first screw member of the hinge device in FIG. 3.
Figure 10:
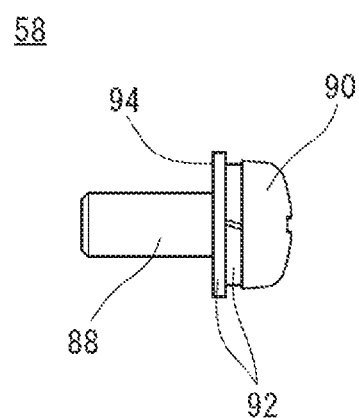
FIG. 10 illustrates a second screw member of the hinge device in FIG. 3.
Figure 11:
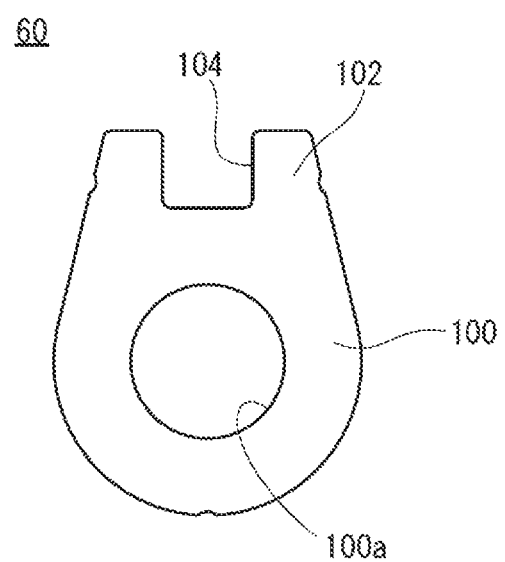
FIG. 11 illustrates a rotation restricting washer of the hinge device in FIG. 3.

As illustrated in FIGS. 4 to 6, the friction washer 62 is disposed between the support plate portion 68 of the fixed member 52 and the movable plate portion 76 of the pivotable member 54. The friction washer 62 is a flat washer that determines the friction coefficient of the sliding faces between the support plate portion 68 and the movable plate portion 76.

Three spring washers 64 are disposed between the movable plate portion 76 of the pivotable member 54 and the bearing face 94 of the second screw member 58. In this embodiment, one of the spring washers 64 is disposed between the movable plate portion 76 and the rotation restricting washer 60, and two of the spring washers 64 are disposed between the rotation restricting washer 60 and the bearing face 94 of the second screw member 58. The spring washers 64 are disc springs. The spring washers 64 in contact with the rotation restricting washer 60 are disposed such that the protruding faces of the spring washers 64 are in contact with the rotation restricting washer 60. Note that the number, position and type of the spring washers 64 may be appropriately modified.

A lubricant, such as grease, is applied to the sliding faces including the right-side face of the support plate portion 68 and both faces of the movable plate portion 76 for the purpose of enhancing endurance.

When the hinge device 50 including the components described above is assembled, the friction washer 62, the pivotable member 54, one of the spring washers 64, the rotation restricting washer 60, and two of the spring washers 64 are attached in this order to the shaft 82 of the first screw member 56 attached to the support plate portion 68 of the fixed member 52. At this time, the restricting piece 72 of the fixed member 52 is fitted into the receiving portion 104 of the rotation restricting washer 60 through the cutout 80 of the pivotable member 54. Then, the internal threads of the shaft 88 of the second screw member 58 and the external threads of the shaft 82 of the first screw member 56 are fastened together and tightened, to assemble the hinge device 50.

In the hinge device 50 having such a configuration, the support plate portion 68 of the fixed member 52 and the movable plate portion 76 of the pivotable member 54 are disposed such that the two plate-like portions of the members are aligned along the axial direction, instead of one of the fixed member and the pivotable member holding the other one. As a result, the entire areas of the sliding faces appropriately come into plane contact with each other. Thus, it is possible to appropriately set the rotational torque between the support plate portion 68 and the movable plate portion 76.

As clearly understood from FIG. 6, the receiving portion 104 of the rotation restricting washer 60 is fitted over the restricting piece 72 of the fixed member 52, to restrict the turning relative to the support plate portion 68. In other words, the rotation restricting washer 60 is non-turnable relative to the support plate portion 68. Thus, when the pivotable member 54 or the operation panel 28 pivots, only the components disposed between the support plate portion 68 and the rotation restricting washer 60 turn, and the second screw member 58 is prevented from rotating together with the operation panel 28.

The restricting piece 72 of the fixed member 52 passes through the cutout 80 of the pivotable member 54 to restrict the pivot angle of the pivotable member 54 or the operation panel 28 relative to the support plate portion 68. In specific, the restricting piece 72 of the fixed member 52 serves as a rotation restrictor that prevents the co-rotation of the second screw member 58, and also as an angle restrictor that restricts the pivot angle of the pivotable member 54 relative to the support plate portion 68. Thus, the configuration of the hinge device 50 can be simplified, and the number of components thereof can be reduced, in comparison with a hinge device that includes separate components for co-rotation prevention and the angle restriction.

In this embodiment, the extension 102 is disposed on the rotation restricting washer 60, and the restricting piece 72 and the receiving portion 104 are disposed remote from the axial center of the pivot shaft. Thus, the backlash angle per tolerance range is reduced, thereby reducing backlash operation. In specific, the backlash operation that occurs during pivoting of the operation panel 28 is reduced. This enhances the operability of the operation panel 28.

The spring washers or disc springs 64 in contact with the rotation restricting washer 60 are disposed such that the protruding faces of the spring washers 64 are in contact with the rotation restricting washer 60. This reduces the friction coefficient determined between the rotation restricting washer 60 and the spring washers 64. Thus, even when the rotation restricting washer 60 slightly turns relative to the support plate portion 68 due to the tolerance of the restricting piece 72 and the receiving portion 104, the spring washers 64 absorb the turning motion, to prevent the transmission of the turning force to the second screw member 58. Thus, the second screw member 58 can be more reliably prevented from rotating together with the operation panel 28.

According to the first embodiment described above, the rotation restricting washer 60, which is non-turnable relative to the support plate portion 68, is provided. Thus, the second screw member 58 can be prevented from rotating together with the operation panel 28. Thus, loosening of the second screw member 58 relative to the first screw member 56 can be appropriately prevented.

Second Embodiment

A hinge device 50 according to a second embodiment of the present invention will now be described with reference to FIGS. 12 and 13. The components that are common to those in the first embodiment are denoted by same reference numbers, and redundant descriptions are omitted or simplified. Although not illustrated in FIG. 12, a friction washer, spring washers, etc., are also appropriately provided in the second embodiment.

Figure 12:
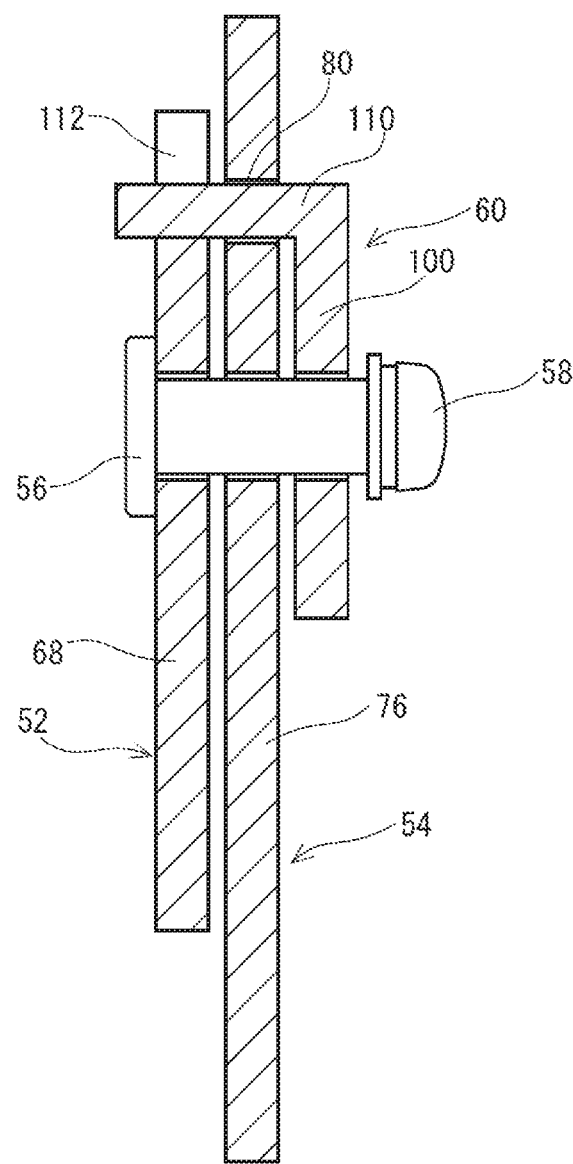
FIG. 12 is a schematic cross-sectional view of a hinge device according to a second embodiment of the present invention.
Figure 13:
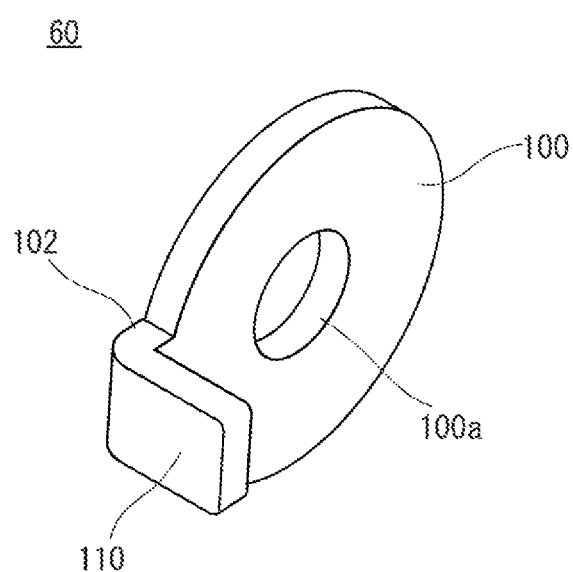
FIG. 13 illustrates a rotation restricting washer of the hinge device in FIG. 12.

In the second embodiment, a rotation restricting washer 60 includes a flat annular body 100 having an insertion hole 100a, and an extension 102 projecting radially outward from the body 100, as illustrated in FIGS. 12 and 13. The extension 102 has a flat rectangular restricting piece 110 extending in the axial direction of a first screw member 56 or the rotary shaft. A support plate portion 68 of a fixed member 52 has a recessed receiving portion 112 that is fitted over the restricting piece 110 of the rotation restricting washer 60. The restricting piece 110 of the rotation restricting washer 60 is fitted into the receiving portion 112 of the fixed member 52 through a cutout 80 in a pivotable member 54, thereby restricting the turning of the rotation restricting washer 60 relative to the support plate portion 68. This prevents the second screw member 58 from rotating together with the operation panel 28.

Also in the second embodiment, the same advantageous effects as those of the first embodiment are achieved, and loosening of the second screw member 58 relative to the first screw member 56 can be appropriately prevented.

Third Embodiment

A hinge device 50 according to a third embodiment of the present invention will now be described with reference to FIG. 14. The components that are common to those in the first embodiment are denoted by same reference numbers, and redundant descriptions are omitted or simplified. Although not illustrated in FIG. 14, a friction washer, spring washers, etc., are also appropriately provided in the third embodiment.

Figure 14:
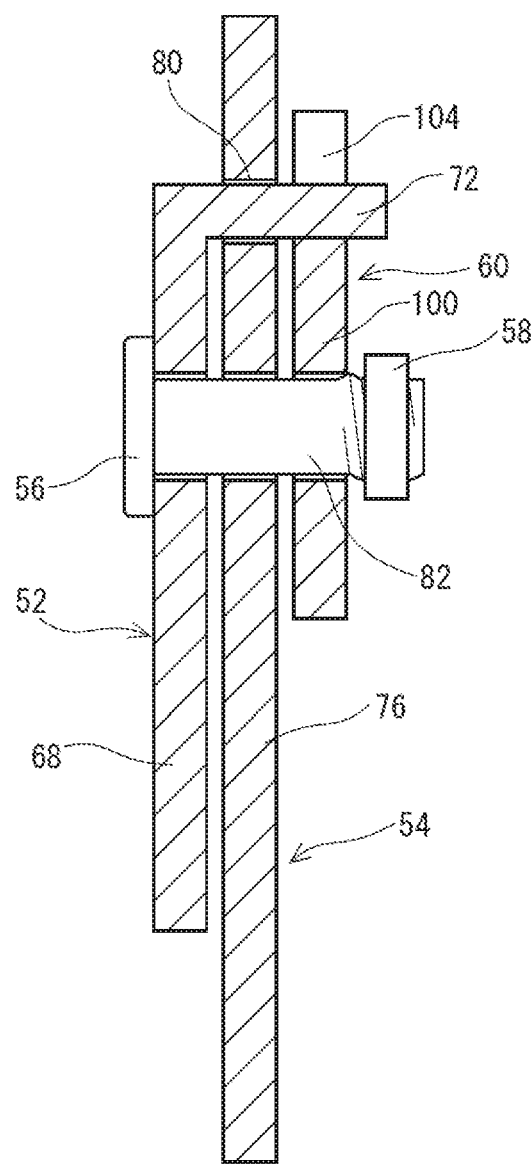
FIG. 14 is a schematic cross-sectional view of a hinge device according to a third embodiment of the present invention.

In the third embodiment, a first screw member 56 disposed non-turnably on a support plate portion 68 of a fixed member 52 is an external thread member having threads on its outer peripheral face at the tip portion of a shaft 82, as illustrated in FIG. 14. A second screw member 58 fastened to the first screw member 56 is an internal thread member, such as a nut.

Also in the third embodiment, the same advantageous effects as those of the first embodiment are achieved, and loosening of the second screw member 58 relative to the first screw member 56 can be appropriately prevented.

Note that in the above-described embodiments, the first screw member 56 attached to the support plate portion 68 of the fixed member 52 is provided as a separate component. Alternatively, the first screw member 56 may be preliminarily integrated with the support plate portion 68. In other words, the first screw member 56 disposed non-turnably on the support plate portion 68 may be a first screw member 56 integrated with the support plate portion 68.

In the above-described embodiments, the shaft 82 of the first screw member 56 serves as a rotary shaft for pivotably supporting the pivotable member 54. Alternatively, in the case where the second screw member 58 is an external thread member, the shaft 88 of the second screw member 58 may be the pivot shaft.

Note that the image forming apparatus 10 may be a copying machine, a facsimile machine, a printer, or the like, or a multifunction peripheral combining at least two of these, or may be a monochrome machine. The image former of the image forming apparatus 10 may be of an inkjet type.

The specific numerical values, component shapes, etc., described above are mere examples, and can be appropriately modified if required by product specifications.

What is claimed is:

1. A hinge device pivotably connecting an operation panel to a body of an image forming apparatus, the hinge device comprising:
    a fixed member having a support plate portion and a fixed plate portion fixed to the body of the image forming apparatus;
    a first screw member disposed non-turnably on the support plate portion;
    a second screw member fastened to the first screw member;
    a pivotable member including:
    a panel support portion supporting the operation panel; and
    a movable plate portion held between the support plate portion and a bearing face of the second screw member,
    the pivotable member being pivotable relative to the fixed member around the first screw member or the second screw member serving as a pivot shaft; and
    a rotation restricting washer disposed between the movable plate portion and the bearing face of the second screw member,
    the support plate portion having a restricting piece formed therewith and extending therefrom in an axial direction of the pivot shaft,
    the rotation restricting washer having a receiving portion that is fitted over the restricting piece to restrict turning of the rotation restricting washer relative to the support plate portion, and
    the movable plate portion having a cutout through which the restricting piece passes to restrict a pivoting angle of the pivotable member relative to the support plate portion.

2. The hinge device according to claim 1, wherein:
    the rotation restricting washer has an extension projecting radially outward, and
    the receiving portion is disposed on the extension.

3. The hinge device according to claim 1, further comprising:
    a friction washer disposed between the support plate portion and the movable plate portion.

4. The hinge device according to claim 1, further comprising:
    at least one spring washer disposed between the movable plate portion and the bearing face of the second screw member.

5. The hinge device according to claim 4, wherein:
    the spring washer includes a disc spring, and
    the disc spring in contact with the rotation restricting washer is disposed such that a protruding face of the disc spring is in contact with the rotation restricting washer.

6. An image forming apparatus comprising:
    an operation panel pivotable relative to a body of the apparatus,
    the body and the operation panel being connected using the hinge device according to claim 1.

* * * * *